Aug. 27, 1940.  R. D. McINTOSH  2,212,745
RESILIENT COUPLING FOR TUBING
Filed Jan. 26, 1938
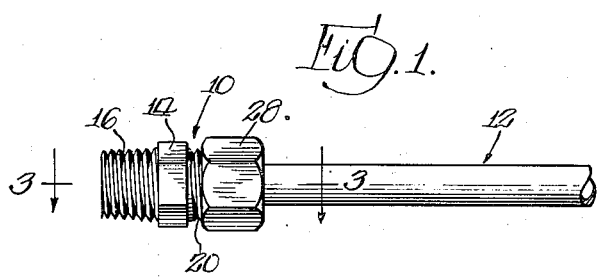
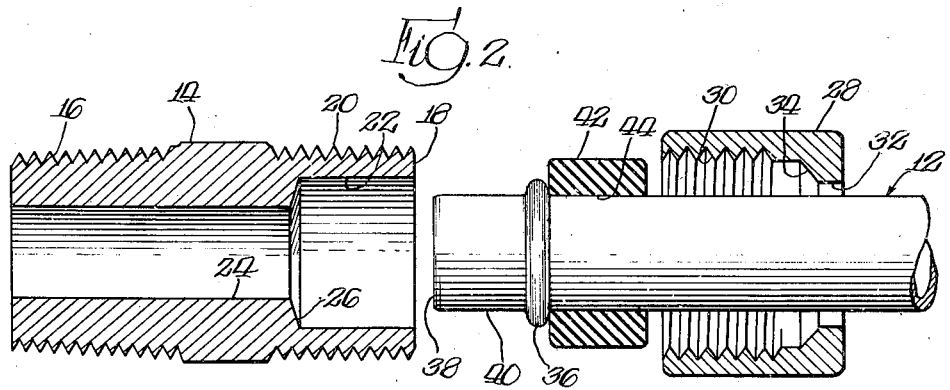
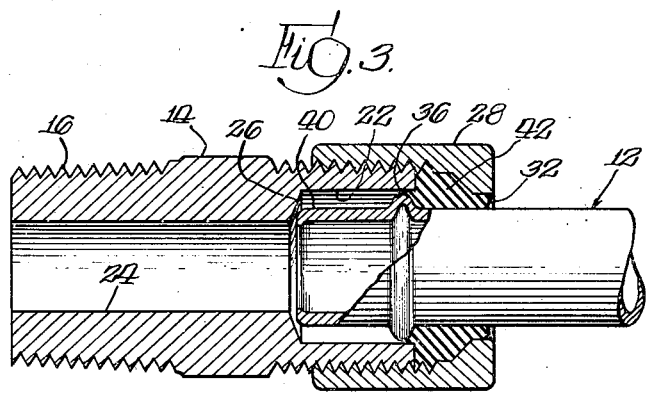
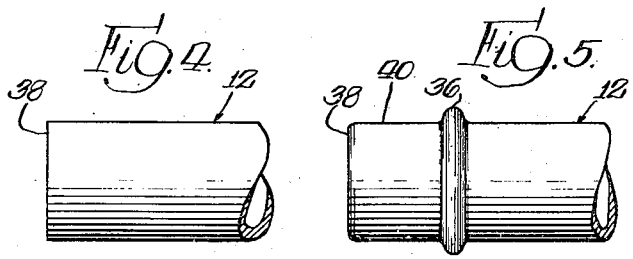 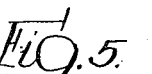
Inventor:
Robert D. McIntosh,
By Bair & Freeman Attys.

Patented Aug. 27, 1940

2,212,745

UNITED STATES PATENT OFFICE 2,212,745

RESILIENT COUPLING FOR TUBING

Robert D. McIntosh, River Forest, Ill., assignor to The Imperial Brass Manufacturing Co., Chicago, Ill., a corporation of Illinois Application January 26, 1938, Serial No. 187,002

1 Claim. (Cl. 285—90)

One of the objects of my invention is the provision of a new and improved resilient coupling for tubing, simple in construction and relatively inexpensive to manufacture.

Another object to my invention is to provide a coupling for ductile tubing made of such substances as copper or aluminum which permits the coupling to be vibrated innumerable times without causing leaks at the joint.

Another object is the provision of a resilient coupling for ductile tubing which permits a flexure of the tube within the coupling so that there is no appreciable bending of the walls of the tubing such as would ordinarily fatigue the metal or cause crystallization which would result in a break or a leaky joint.

A further object is to provide a flexible coupling for ductile tubing wherein a space is provided within one of the coupling parts to permit a rotation or a tilting of the end of the tubing in order to compensate for motion caused by vibration, there being additionally provided when desired, a projection adjacent the tubing operable in some measure as a fulcrum cushioned by a resilient sealing pad when the tubing is vibrating.

Still a further object is the provision of a resilient coupling for tubing which provides a space to permit a tilting of the tubing during vibration and which also provides a stop to assure the proper positioning of the end of the tubing within the coupling so that there may be no binding which might serve to interfere with the desired movement.

A further object still is to provide a pair of coupling members adapted to form a resilient joint for tubing whose walls are relatively stiff, wherein a projection is raised upon the tubing wall near the end serving the purpose of both a fulcrum for allowing the tubing to tilt when vibrated and a flange against which a resilient packing may be compressed for sealing the tubing within the coupling and preventing its withdrawal.

With these and other objects in view my invention consists in the construction, arrangement and combination of the various parts of my device, whereby the objects contemplated are attained, as hereinafter more fully set forth, pointed out in my claim, and illustrated in the accompanying drawing, in which:

Figure 1 is a small scale side elevation of a resilient coupling.

Figure 2 is an exploded sectional view of the coupling parts before assembly.

Figure 3 is a sectional view on the line 3—3 of Figure 1.

Figure 4 is a fragmental view of a tubing end.

Figure 5 is a fragmental view of tubing similar to that shown in Figure 4 provided with a suitable configuration.

In the past it has been the custom to make up joints using any one of a variety of couplings and a length of copper, aluminum or other tubing which in spite of being made of ductile metal have relatively stiff walls. The stiffness of the walls, however, has an advantage in permitting them to be formed into flares for being gripped by coupling devices, so as to make up joints capable of rapid assembly on the job where the mechanic has only a few tools to work with. Where the tubing is used on machines and particularly high speed engines a disadvantage becomes apparent when there is excessive vibration. While it is true that ductility of the tubing absorbs some measure of vibration, repeated vibration causes a flexure at the coupling where the tubing is rigidly secured resulting in there being an undue amount of bending of the tubing wall causing fatigue of the metal and eventual breaking of the wall. Once a leak occurs there is no remedy but to remake the joint. The coupling herein described supplies a joint by means of which such copper or aluminum tubing can be coupled in a manner to permit movement of the tubing itself without the customary bending or flexing of the metal wall. This is accomplished by permitting the tubing to move, tilt or flex within the joint.

The invention is embodied in a device comprising a coupling element indicated generally by the numeral 10 used for making a connection with the end of a length of tubing 12.

The coupling element itself comprises a pair of coacting threaded parts, one of which is a male fitting 14 having at the left end, as viewed in Figure 2, a standard pipe thread 16 and having at the right end a portion 18 provided with external threads 20 and having an aperture 22 at the inside. There is also a central bore 24 through the fitting to provide for the flow therethrough of liquid or gas. It will be noted that the aperture 22 is larger in diameter than the central bore 24 so that where they join one with the other there is provided an annular shoulder 26.

The other coacting part of the coupling element consists of a nut 28 internally threaded as at 30 so as to engage the external threads 20 on the male fitting. The nut is provided with a passage 32 through which the tubing 12 may pass. By reason of the fact that the diameter of the interior portion 30 is considerably greater than the diameter of the passage 32, there is provided a pocket like portion 34 within the nut.

The tubing 12 for which this resilient coupling is designed is of the customary variety, in some cases standard copper tubing and in other cases standard aluminum tubing. Although tubing of the sort has some flexible characteristics in that it can be bent and flexed to a certain degree, it is not inherently flexible to the extent that it can be vibrated indefinitely without damage to the metal comprising its walls. The tubing, however, can be readily worked and in the embodiment shown there has been raised an annular bead or flange 36 shown to be formed from the wall of the tubing itself. The flange in this instance is formed a short distance inward from the end 38 leaving a short length of tubing 40 having substantially the same diameter as the outside diameter of the tubing. It is to be noted that the maximum outside diameter of the flange 36 is made so that it is only a few thousandths of an inch smaller than the diameter of the aperture 22 and it has been found in practice that it is convenient to make the flange diameter ten thousandths of an inch smaller. A difference of this amount gives sufficient clearance to allow for inaccuracies in making the several parts and at the same time brings the outside diameter of the flange to within a very short distance of the inner wall of the aperture 22 so that it effectively dams an annular space between the outside wall of the tubing and the inner wall of the aperture. At the time the flange is raised the end 38 is peened inward slightly so that the end is rounded.

To complete the coupling there is provided a sleeve 42 of compressible, deformable material such as rubber or any of its several substitutes having an arbitrary cross section considerably greater in area than the area of the pocket 34 in the nut. The sleeve has an inside diameter 44 approximately that of the outside diameter of the tubing 12 so that it may be easily slipped over the end of the tubing and if preferred stretched over the bead or flange 36.

When the coupling is assembled, the tubing is cut off to a suitable length and the nut 28 is slid over the end so that the tube 12 protrudes some distance through the passage 32 therein. Then by use of some convenient tool, the bead or flange 36 is raised upon the outer wall of the tubing and the dimension held to the preferred tolerance. The sleeve 42 can then be slipped over the end of the tubing and also stretched over the bead or flange 36 and pushed along the tubing until it occupies a position somewhat as shown in Figure 2, although if preferred the sleeve may be placed over the tubing before the bead or flange is raised.

With the parts thus prepared, the end 38 of the tubing is inserted into the aperture 22 and it will be noted that the end of the tubing, being slightly greater in diameter than the central bore 24 of the fitting, will be prevented from entering the fitting a distance deeper than the position of the shoulder 26. This is largely a safeguard since it is preferable to leave a short clearance between the end of the tubing and the shoulder as illustrated in Figure 3. The position of the bead inward from the end 32 of the tubing is such that it also enters a short distance into the aperture 22. With the tubing in place, the nut 28 is threaded upon the male fitting 14 and screwed tightly into place. This action causes a distortion of the resilient sleeve 42 to such an extent that it completely fills the pocket 34 and overflows into the passage 32 on one side and presses tightly against the flange 36 on the other. Since the cross sectional area of the resilient sleeve 42 is materially greater than the cross sectional area of the pocket 34 there will be plenty of the compressible material to expand into the areas adjacent the pocket and the material itself will be compressed tightly into place against the tubing and the bead or flange making a tightly sealed joint.

The aperture 22 is made considerably larger than the outside diameter of the tubing 12 so that there will be an annular space between the end of the tubing and the walls of the aperture when the coupling is assembled. By reason of the fact that the walls of the tubing 12 are relatively stiff, especially in short sections, when the tubing is vibrated there will be space within the coupling to permit movement of the end 40 of the tubing. In this connection it is also to be noted that since the outside diameter of the flange or bead 36 is almost equal to the diameter of the aperture 22, the bead or flange actually forms a fulcrum or rotating joint for the tubing so that when vibrations occur, the end 40 will be allowed to tilt slightly. The main portion of the tubing 12 to the right of the bead or flange will vibrate short distances to and fro without a bending of the walls because of the resiliency of the compressed sleeve 42.

Such an arrangement as this actually permits movement of the tube within the coupling and makes it possible to prevent bending or flexure of the metal comprising the tubing walls. All vibratory motion therefore is absorbed by the resilient sleeve 42 and there is no fatiguing of the metal in the tubing. Should continued vibration start a slight leak around the joint, it is necessary only to take up slightly on the nut 28 in order to compress the sleeve more tightly and to again make a tight joint. During vibration the flange in addition to acting as a dam for the annular space within the aperture is cushioned against the compressed resilient sleeve, adding support to the joint and preventing the tubing from being pulled through the nut such as would be likely if friction between the resilient sleeve and the tubing wall alone were depended upon in order to hold the coupling together. Moreover by increasing the pressure on the sleeve material of an originally more or less loose consistency can be compacted into a tightly sealed joint.

When it is desired to disassemble the joint it is only necessary to unscrew the parts and pull the tubing loose from the male fitting. The resilient sleeve having entered the aperture 22 only a short distance is easily withdrawn and will resume, to some extent, its original shape. When the joint is remade the same sleeve may be used and compressed into place as has been heretofore described.

Some changes may be made in the construction and arrangement of the parts of my device without departing from the real spirit and purpose of my invention, and it is my intention to cover by my claim, any modified forms of structure or use of mechanical equivalents, which may be reasonably included within their scope.

I claim as my invention:

A separable resilient coupling for thin walled tubing which is subjected to vibration comprising one coupling member having a passage therethrough and a cylindrical walled recess larger in diameter than the passage forming one end thereof, a second coupling member engaging the first having a passage therethrough for the tubing and a cylindrical walled recess larger in diameter than said last passage, said tubing including an outwardly extending convex bead of substantially the same thickness as the tubing wall having an outside maximum diameter slightly smaller than the inside diameter of said first recess by an amount sufficient to substantially close said last recess while providing a sliding fit for the tubing bead therein free from metal to metal contact with the coupling members, the walls of said recesses together with the outer surface of said bead forming a closed pocket in the coupling, coacting threaded elements on the coupling members for assembling the coupling, and a retaining and sealing sleeve for the coupling of resilient incompressible material initially longer than said pocket having a distorted form filling the space within said pocket and in contact with the walls of said recesses and the convex outer surface of the bead comprising together with the bead substantially a ball and socket joint adapted to the reception and retention of said bead at a predetermined spaced relation relative to the adjacent walls during movement accompanying vibration of the tubing.

ROBERT D. McINTOSH.